(12) United States Patent
Heim

(10) Patent No.: US 10,583,685 B2
(45) Date of Patent: Mar. 10, 2020

(54) SCULPTURE MAKING SYSTEM

(71) Applicant: Brenda A. Heim, Umatilla, FL (US)

(72) Inventor: Brenda A. Heim, Umatilla, FL (US)

( * ) Notice: Subject to any disclaimer, the term of this patent is extended or adjusted under 35 U.S.C. 154(b) by 233 days.

(21) Appl. No.: 15/611,242

(22) Filed: Jun. 1, 2017

(65) Prior Publication Data

US 2018/0350248 A1 Dec. 6, 2018

(51) Int. Cl.
| G09B 19/00 | (2006.01) |
| B44B 11/00 | (2006.01) |
| G09B 19/10 | (2006.01) |
| B44C 5/00 | (2006.01) |

(52) U.S. Cl.
CPC ............... *B44B 11/00* (2013.01); *B44C 5/00* (2013.01); *G09B 19/10* (2013.01)

(58) Field of Classification Search
USPC ............ 434/81, 82, 83, 96, 97; 446/92, 107, 446/109, 111
See application file for complete search history.

(56) References Cited

U.S. PATENT DOCUMENTS

| 2,622,366 | A | * | 12/1952 | Abplanalp | ............ | A63H 13/02 |
| | | | | | | 273/140 |
| 3,906,658 | A | | 9/1975 | Gross | | |
| 3,992,724 | A | | 11/1976 | Bosler | | |
| 4,770,945 | A | | 9/1988 | Wachspress | | |
| 4,986,756 | A | * | 1/1991 | Yamaguchi | ............... | A63F 9/06 |
| | | | | | | 273/157 R |
| 5,310,376 | A | * | 5/1994 | Mayuzumi | ............. | A63H 33/04 |
| | | | | | | 446/107 |
| 5,314,192 | A | * | 5/1994 | Broudy | ............... | A63F 3/00097 |
| | | | | | | 273/282.3 |
| 5,395,278 | A | | 3/1995 | Dickhut | | |
| 5,432,991 | A | * | 7/1995 | Godleski | .................. | A63H 3/14 |
| | | | | | | 116/306 |
| 5,474,483 | A | * | 12/1995 | Sun | ........................ | A63H 3/005 |
| | | | | | | 280/33.998 |
| 5,674,103 | A | * | 10/1997 | Bean | ....................... | A63H 33/04 |
| | | | | | | 206/457 |
| 5,916,006 | A | * | 6/1999 | Ganson | .................. | A63H 33/00 |
| | | | | | | 446/107 |
| 6,568,981 | B1 | * | 5/2003 | Chang | .................. | A63H 33/048 |
| | | | | | | 24/306 |
| 6,935,070 | B2 | * | 8/2005 | Ramirez | .................. | A01G 9/12 |
| | | | | | | 47/41.01 |
| 7,347,028 | B1 | * | 3/2008 | Bin-Nun | .............. | A63H 33/086 |
| | | | | | | 446/112 |
| 7,955,155 | B2 | * | 6/2011 | Tremblay | ............. | A63H 33/046 |
| | | | | | | 446/85 |
| 8,961,257 | B2 | * | 2/2015 | Connor | ................ | A63H 33/065 |
| | | | | | | 446/107 |
| 9,327,205 | B2 | * | 5/2016 | Gongolas | ............... | A63H 33/00 |
| 2007/0042328 | A1 | | 2/2007 | Read | | |
| 2009/0292034 | A1 | * | 11/2009 | Tomomatsu | .......... | C08J 9/0061 |
| | | | | | | 521/134 |
| 2009/0297875 | A1 | | 12/2009 | Hart | | |

(Continued)

*Primary Examiner* — Kurt Fernstrom
(74) *Attorney, Agent, or Firm* — William M. Hobby, III

(57) ABSTRACT

This invention relates to a method of making a sculpture from a sculpture kit which includes a container with a lid and an elongated thin, twistable, resilient or springy strip of paper-like material forming a sculpture when twisted and removably attached to the kit container lid with the container forming the base of the sculpture.

11 Claims, 3 Drawing Sheets

(56) References Cited

U.S. PATENT DOCUMENTS

| | | | |
|---|---|---|---|
| 2011/0171613 A1 | 7/2011 | Burks | |
| 2013/0017756 A1* | 1/2013 | Lai | A01K 15/025 |
| | | | 446/369 |
| 2014/0256210 A1* | 9/2014 | Johnson | A63H 33/046 |
| | | | 446/108 |
| 2015/0119981 A1* | 4/2015 | Khairkhahan | A61F 2/2442 |
| | | | 623/2.36 |
| 2015/0283475 A1* | 10/2015 | Hiller | A63H 33/046 |
| | | | 446/92 |
| 2016/0311994 A1* | 10/2016 | Van Es | B29C 44/50 |
| 2017/0226306 A1* | 8/2017 | Silvi | C08J 9/122 |

* cited by examiner

SCULPTURE MAKING SYSTEM

FIELD OF THE INVENTION

This invention relates generally to a sculpture kit and to a sculpture making system and especially to a sculpture system for teaching art.

BACKGROUND OF THE INVENTION

Sculpture is the branch of the visual arts that operates in three dimensions. Durable sculptural processes originally used carving, by the removal of material, such as clay, in stone, metal, ceramics, wood and other materials, but since modernism, there has been an almost complete freedom of materials and processes. A wide variety of materials may be worked by removal, such as by carving, assembled by welding or modeling, or by molded or cast.

Young children are normally not taught sculpting in schools because it generally requires the manipulation of materials which either requires the forming of materials which requires one to get dirty and requires the use of tools to work clay, metal, wood, stone or the like by pounding, cutting, chipping or welding.

There is a need for a hands-on system for teaching sculpting which helps in the teaching of art in sculpting by children and for teaching the basics of abstract design.

There have been systems in the past for teaching or creating sculptures using simple kits or systems using materials that can be hand manipulated to form shapes without the use of special tools. Typical systems can be seen in the U.S. Patent Application Publications to Hart, No. 2009/0297875, for a sculpture kit using a coiled segment and couplers for connecting the ends together and in the Burks, Publication No. 2011/0171613, for a sculpture manipulative game using square, flat sheet of flexible, plastic material to create numerous sculptural forms. The U.S. Patent Publication to Read, No. US 2007/0042328, is for a dual coupling link for rubber band sculptures.

Other prior U.S. Patents which show sculpture constructing systems can be seen in the Wachspress U.S. Pat. No. 4,770,945 for a sculpture and method for constructing by defining a seed having a plurality of algebraic in which the sum of the orders of the surfaces is five or greater and has a plurality of edges at the intersection of the surfaces. In the U.S. Patent to Gross, U.S. Pat. No. 3,906,658, a magnetic toy has magnetic sculptural particles shaped together on a non-magnetic surface. The Bosler U.S. Pat. No. 3,992,724 is for a folded structure having utility as a structure for a fanciful novelty structure. The Dickhut U.S. Pat. No. 5,395,278 is for a manually manipulable flexible toy which has a semi-rigid elongated plastic tube forming a bellows which can have the ends joined.

The present invention is for a sculpture and art teaching kit especially for children. A container has one or more rolls of elongated springy or resilient material, such as coated paper, polymer paper, or the like, which may be held in a roll with a cord or ribbon in a container with a lid. The rolled resilient paper can be unrolled and twisted to form an abstract sculpture and then removably attached to the cover of the container with fasteners positioned to hold the twisted paper sculpture shape to the lid of the container so that the container becomes the base for the sculpture.

SUMMARY OF THE INVENTION

This invention relates to a method of making a sculpture from a sculpture kit having an elongated flat, twistable, resilient or springy member forming a sculpture when twisted and attached to the kit container, such as the container lid. A sculpture kit is selected which has a container having a lid covering an opening thereinto, the lid having a fastener portion thereon, and having an elongated strip of flexible and resilient generally flat material, such as a roll of flexible resilient coated paper, contained in the kit and held in the container when not being used to form a sculpture. The kit strip of material being twistable to form a sculptural shape and having first and second end portions having fastener portions on each end portion. The elongated strip of material is twisted to form a sculptural shape and has the twisted elongated strip of material sculptural shape first and second end portion fasteners attached to the container lid fastener portion to hold the twisted elongated strip of material to the container lid in the twisted sculpture shape thereby forming a sculpture on the container lid so that the container forms a base for the sculpture.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings.

DETAILED DESCRIPTION OF AN EXEMPLARY EMBODIMENT

Figure 1:
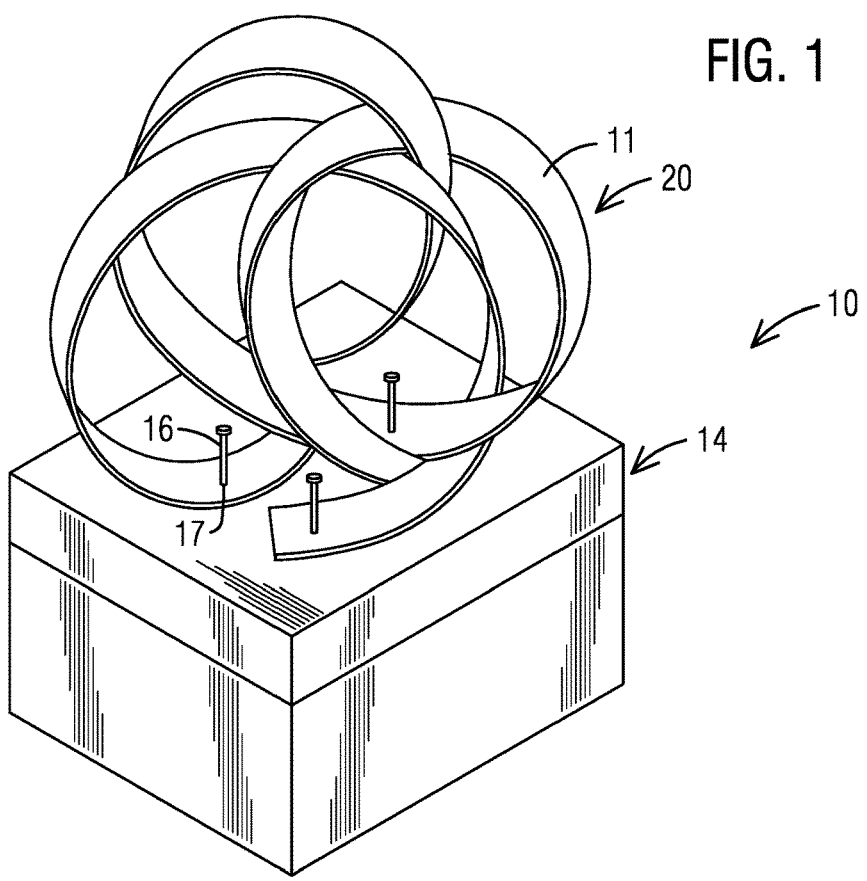
FIG. 1 is a perspective view of a sculpture formed from a kit in accordance with the present invention.

The present invention is for a sculpture and art teaching kit especially for children. Referring to the drawings, FIGS. 1 through 4, a container 10 has one or more rolls of elongated springy or resilient strip of material 11 and 12, such as a paper, coated paper, a thin resilient polymer strip or the like, which may be held rolled up and tied in a roll with a cord or ribbon 13. The container has a lid 14 which may be hinged with hinges 15. The kit may also have tacks or brads 16 therein. The rolls of resilient paper strips 11 and 12 may have a plurality of openings 17 therethrough. The resilient paper strips 11 and 12 may be coated with a polymer or may be a polymer paper, such as a thin sheet of polycarbonate plastic material. Paper herein means any thin, flat material. One of the rolls 11 or 12 can be unrolled by simply untying the roll to let the resilient strip of paper expand. The paper strip can then be twisted to form an abstract sculpture 20 as seen in FIG. 1 and then attached to the cover or lid 14 of the container 10. The container 10 may have openings therein to receive tacks or small nails 16 which are placed through the paper openings 17 and into openings 21 in the container lid 14 to removably attach the twisted paper sculpture 20 thereto. FIG. 3 shows the resilient paper strip 11 having one end attached to the container lid 14 while forming a sculpture by twisting as desired and attaching at the other end and in the middle of the resilient paper strip 11.

Figure 2:
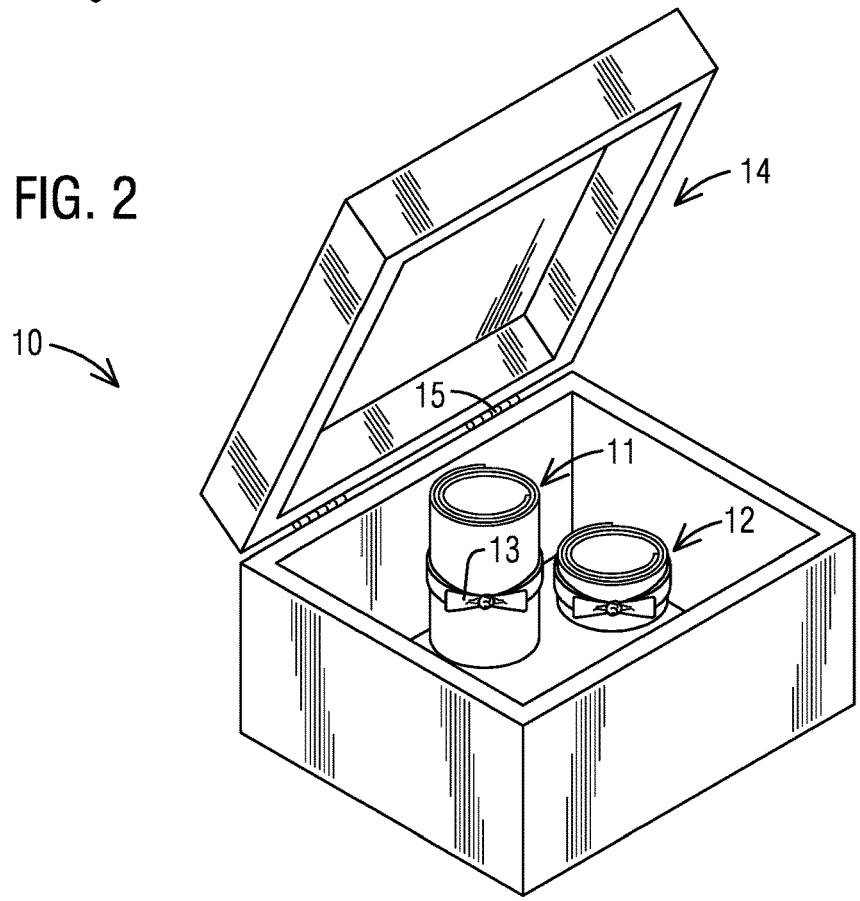
FIG. 2 is a perspective view of the sculpture kit used to form the sculpture of of FIG. 1.
Figure 3:
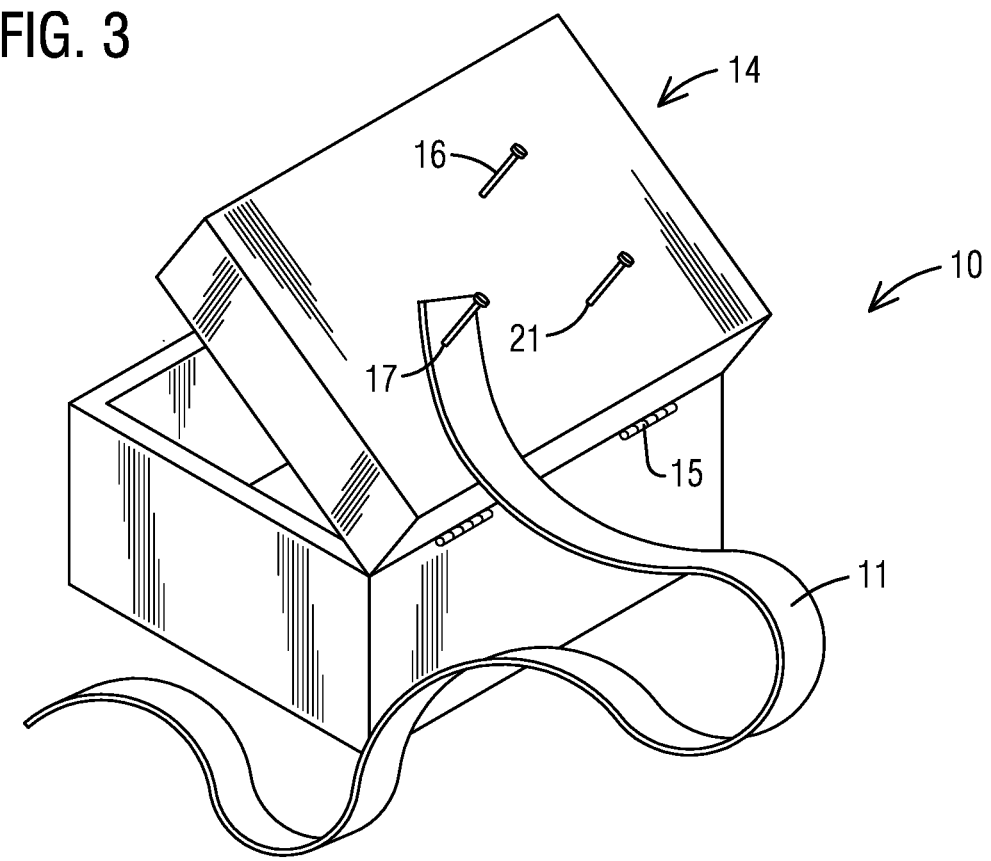
FIG. 3 is a perspective view of a sculpture being formed from the kit of FIG. 2.
Figure 4:
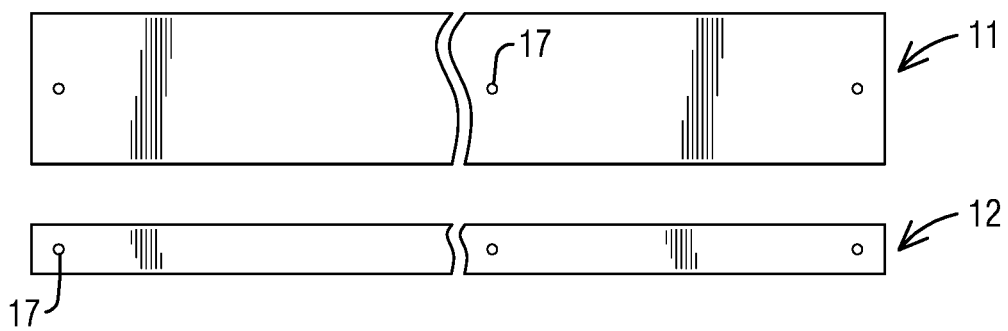
FIG. 4 is a top plan view of the resilient coiled paper strips used in the sculpture kit of the FIGS. 1 through 3.

The process of making a sculpture as seen in FIG. 1 includes the steps of selecting the sculpture kit of FIG. 2, and removing a rolled strip of resilient material 11 or 12 from the container 10. The coiled strip of material 11 or 12 is then untied to allow the resilient strip to uncoil and is then twisted to form a sculpture 20. The twisted sculpture 20 is then removably attached to the container 10 lid 14. It should be clear that a wide variety of sculptural shapes can be formed by twisting the resilient strips of material 11 or 12 without departing from the spirit and scope of the invention.

Thin, resilient materials for forming the strips 11 and 12 may be purchased from many sources which can include Yupo synthetic paper. The paper can be a polymer paper or a polymer coated paper or any other thin, resilient, flat material desired. The paper is cut into elongated flat strips and holes placed at desired locations.

Figure 5:
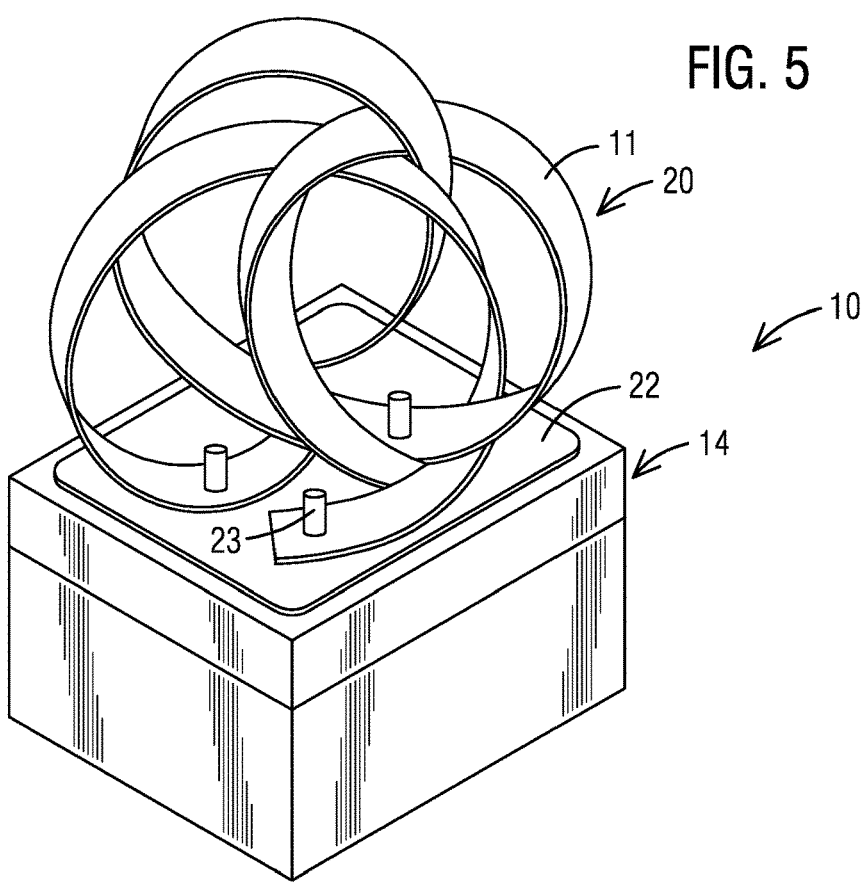
FIG. 5 is a perspective view of an alternate embodiment of the sculpture kit in accordance the present invention using magnetic fasteners.

Referring to FIG. 5, a second embodiment is shown which has the container lid 14 having an ferric sheet 22, such as a steel or iron sheet, attached to the lid 14, such as with an adhesive. The strip of material 11 which has been formed into the twisted sculpture 20 may then be attached to the container 10, lid 14 with a plurality of permanent magnets 23 at different points to maintain the sculpture in position.

Figure 6:
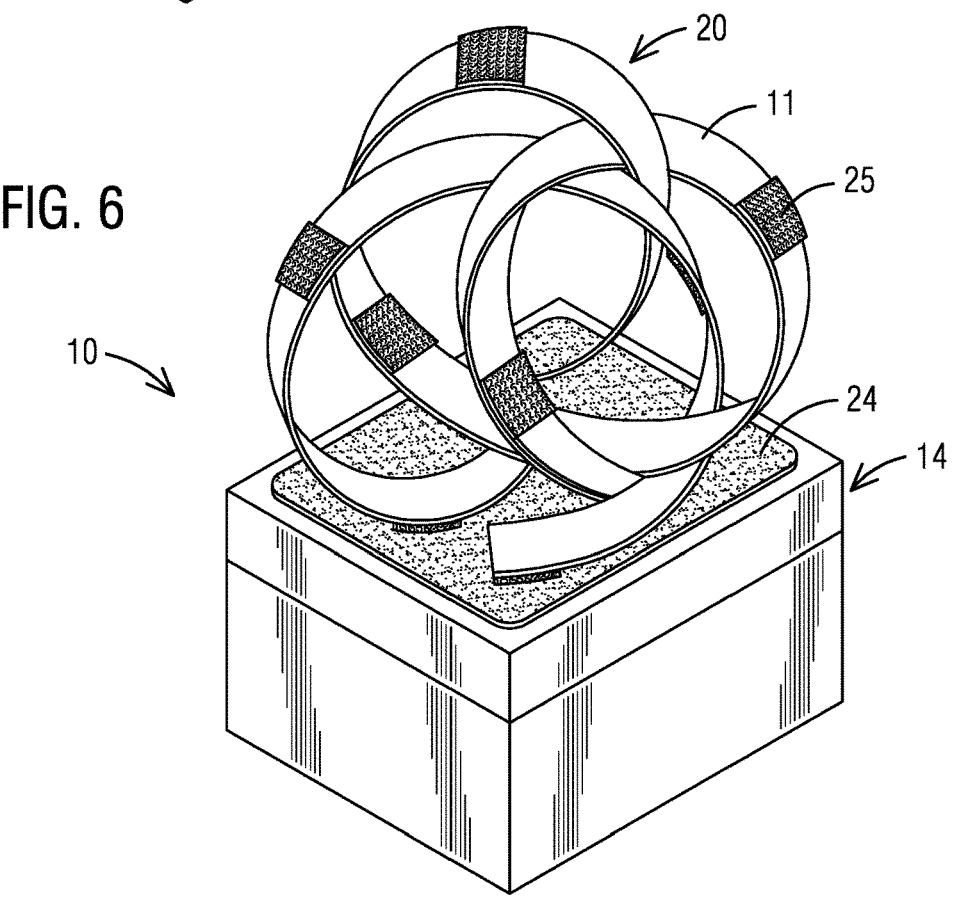
FIG. 6 is a perspective view of another alternate embodiment of the sculpture kit in accordance with the present invention using hook and loop type fasteners.

FIG. 6 shows yet another embodiment in which the kit container 10 lid 14 has a piece of hook and loop (VELCRO) loop material 24 attached to the lid 14, such as by adhesively attaching the material 24 to the lid 14. The resilient paper strip 11 or 12 may then have pieces of the hook material 25 attached to each end of the elongated strip of paper material 11 or 12 and at predetermined points between the ends as shown in FIG. 6. The formed sculpture 20 is attached to the lid 14 by removably attaching selected pieces of hook material to the loop material as desired.

It should be clear at this time that a sculpture kit and method of making a sculpture which can be used to teach children about sculpture art has been provided. However the present invention is not to be considered limited to the forms shown which are to be considered illustrative rather than restrictive.

I claim:

1. A sculpture making kit comprising:
   a container having a lid covering an opening thereinto, said container shaped to form a base for a sculpture, and said container lid having a fastener portion on top thereof;
   an elongated strip of thin, resilient, generally flat polymer material coating an elongated strip of thin, generally flat paper being adapted to fit into said container, said strip of thin, resilient polymer material having first and second end portions and having a fastener portion on each end portion thereof; said elongated resilient strip of polymer material being twistable to form multiple sculptural shapes; and
   said elongated strip of polymer material first and second end portion fasteners being removably attachable to said container lid fastener portion;
   thereby holding the twisted elongated strip of resilient polymer material thereto in a sculptural shape having the container as the sculpture base.

2. The sculpture making kit in accordance with claim 1 in which said elongated strip of thin, resilient, generally flat polymer material is polycarbonate plastic.

3. The sculpture making kit in accordance with claim 1 in which said elongated strip of thin, resilient, generally flat polymer material fastener portion on each end portion thereof includes an opening in each said end portion for receiving a tack therethrough and into an opening in said container lid.

4. The sculpture making kit in accordance with claim 1 in which said container lid fastener portion has a ferric coating on said lid, fastening said elongated strip of thin, resilient, generally flat polymer material thereto with a plurality of permanent magnets.

5. The sculpture making kit in accordance with claim 1 in which said container lid fastener portion is a hook and loop, loop material covering at least a portion of said lid for fastening said elongated strip of thin, resilient, generally flat polymer material thereto with a plurality of pieces of hook material attached to said elongated strip of thin, resilient, generally flat polymer material.

6. A process of making a sculpture comprising the steps of:
   selecting a sculpture kit having a base member, said base member having a fastener portion on one side thereon, and having an elongated strip of thin, resilient, generally flat paper contained with said kit, said thin, resilient, strip of paper having first and second end portions having a fastener portion on each end portion;
   twisting said elongated strip of thin, resilient, paper to form a twisting sculptural shape; and
   removably attaching said elongated strip of thin, resilient generally flat paper first and second end portion fasteners to said base member fastener portion;
   thereby forming a sculpture on said container lid with said container forming a sculpture base.

7. The process of making a sculpture in accordance with claim 6 in which said base member is a container lid for a container for said sculpture kit.

8. The process of making a sculpture in accordance with claim 6 in which the said selected elongated strip of thin, resilient, generally flat paper is a polymer coated paper.

9. The process of making a sculpture in accordance with claim 7 in which the step of removably attaching said elongated strip of thin, resilient, generally flat paper to said container lid fastener portion includes placing a tack though an opening in said thin, resilient, generally flat paper and into an opening in said container lid.

10. The process of making a sculpture in accordance with claim 7 including the step of ferric coating said container lid and attaching said elongated strip of thin, resilient, generally flat paper thereto with a plurality of permanent magnets.

11. The process of making a sculpture in accordance with claim 7 including the step of at least partially covering said container lid with hook and loop, loop material and fastening said elongated strip of thin, resilient, generally flat paper thereto with a plurality of pieces of hook and loop, hook material attached to said elongated strip of thin, resilient, generally flat paper.

* * * * *